July 3, 1934.  P. B. MYERS  1,965,507
SPRING ROLLER ADHESIVE PLASTER RACK
Filed Oct. 24, 1933    2 Sheets-Sheet 1
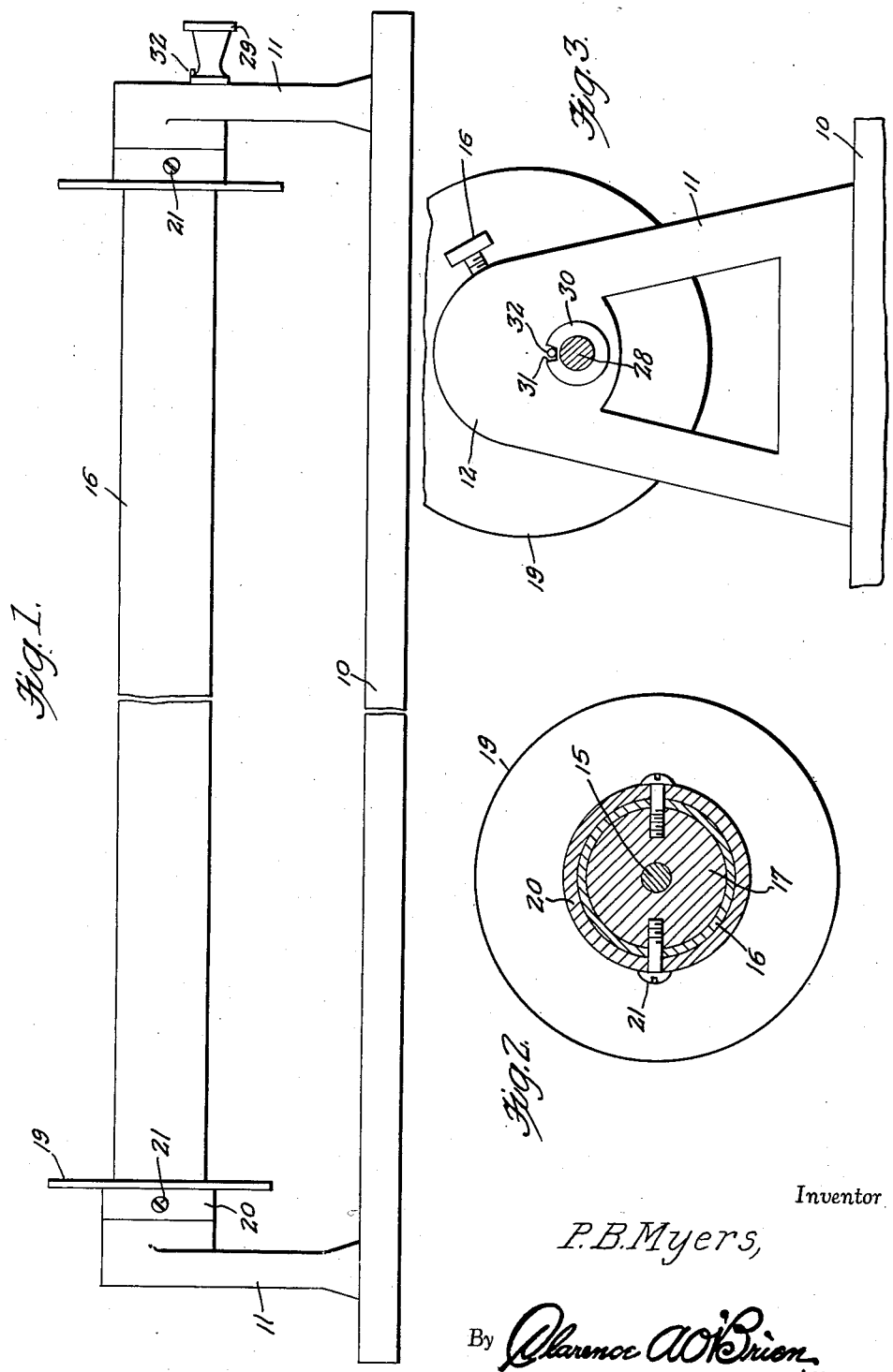

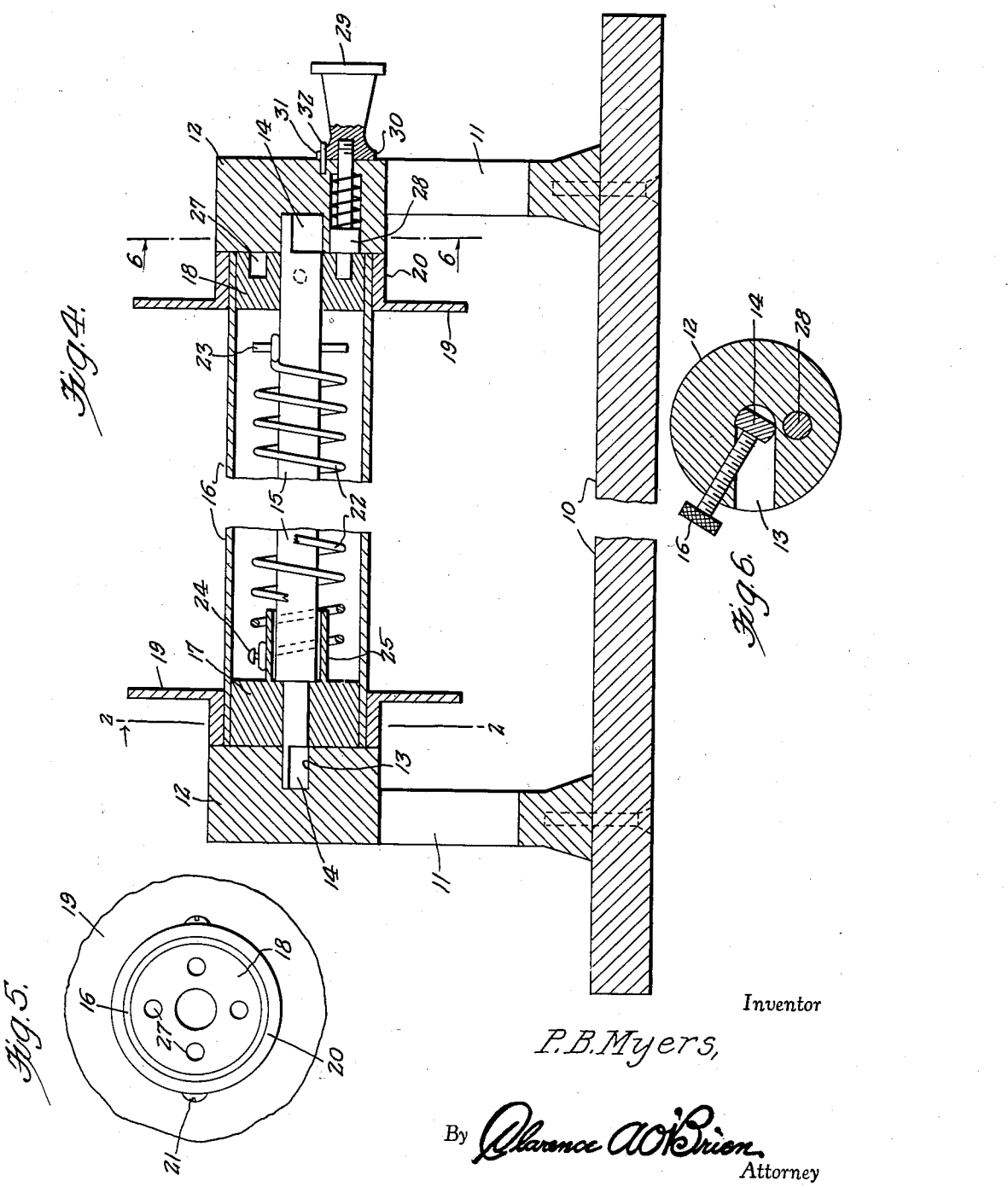

Patented July 3, 1934

1,965,507

UNITED STATES PATENT OFFICE 1,965,507

SPRING ROLLER ADHESIVE PLASTER RACK

Pirl B. Myers, El Reno, Okla.

Application October 24, 1933, Serial No. 695,046

4 Claims. (Cl. 242—107)

This invention has reference to a rack especially designed for holding adhesive tape or plaster rolls to facilitate, and render more sanitary, the handling of such rolls.

Briefly the invention consists in the provision of a rack for the purpose above suggested having a novel form of spring roller associated therewith, and on which the adhesive plaster or tape may be readily wound.

The invention together with its objects and advantages will be best understood from a study of the following description taken in connection with the accompanying drawings wherein:

Figure 1 is an elevational view of the rack.

Figure 2 is a detail sectional view taken substantially on the line 2—2 of Figure 4.

Figure 3 is an end elevational view of the rack with certain parts shown in section.

Figure 4 is a longitudinal sectional view.

Figure 5 is an end elevational view of the roller, and

Figure 6 is a detail sectional view taken through one of the standards, and showing the means for securing the shaft of the roller against rotative movement taken substantially on the line 6—6 of Figure 4.

Referring to the drawings by reference numerals it will be seen that the rack comprises a suitable base 10 which may be mounted on a wall, table or other suitable support and suitably secured thereto. Secured to the base 10 are spaced standards 11 provided with heads having on their inner faces slots or grooves 13 adapted to accommodate the flattened or non-circular ends 14 of a shaft 15. Screws 16 are screw threadedly engaged with the heads of the standards in a manner to bind against the ends 14 of the shaft 15 to secure said ends within the slots 13 and the shaft against rotation.

Mounted on the shaft 15 for rotation relative thereto is a spring roller which includes a tubular body 16 which has arranged in the ends thereof bearings 17, 18. The bearings 17, 18 are suitably apertured to accommodate the ends of the shaft 15 and to support the roller on the shaft in a substantial manner. The roller is also provided with end flanges or headers 19 that have integral collars or hubs 20 embracing the body 16 of the roller. The hub or collars 20 of the flanges 19 are secured to the body 16 of the roller through the medium of screws or other fastening devices 21 which latter also serve to secure the ends of the bearings 17, 18 within the ends of the body 16 of the roller as will be clear from a study of Figure 2.

Arranged within the body 16 of the roller is a coil spring 22 that is operatively connected with the shaft 15 as at 23, and with the roller, by having one end of said spring engaged with a headed stud 24 provided on a tubular extension 25 formed at the inner side of the bearing 17 and extending in spaced concentric relation to the shaft 15. It will thus be seen that the spring 22 will have a tendency to normally urge the roller to rotate in a clockwise direction relative to the shaft 15 for winding the tape or the like on to the roller.

For releasably locking the roller against rotative or angular movement relative to the shaft 15 there is provided on the outer end of the bearing 18 a circular series of apertures 27. A spring pressed plunger 28 is suitably mounted in a recess provided in the head 12 of one of the standards 11 and one end of the plunger 28 is adapted to be engaged with a selected one of the apertures 27 for securing the roller at the desired adjustment. The plunger 28 is provided with a suitable knob or handle 29 that is provided with a flange 30 formed with a notch 31. A stop pin 32 is provided on the head of the said standard 11 and is adapted to engage the flange 30 of the knob 29 for holding the plunger 28 in a retracted position in which position, it being obvious, said plunger will not interfere with the free rotative movement of the roller.

The operation and utility of the device will be apparent from the following:

In actual practice the base 10 is secured to a wall, table or any other suitable support. To initially wind the roll of adhesive plaster or tape to the roller, the roller 16 is first released by retracting the plunger 28 and engaging the flange 30 on the knob of the plunger with the free end of the pin 32 for retaining the plunger in retracted position. The roller 16 is then wound forwardly or in anti-clockwise direction relative to the shaft 15 for placing the spring 22 under tension. When the spring 22 has been wound sufficiently the knob 29 of the plunger is rotated to bring the notch 31 on the flange opposite to the pin 32 to disengage the flange and pin thus permitting the plunger under action of its spring to be projected for engaging the inner end of the plunger with one of the sockets or openings 27 to thereby secure the roller 16 at the desired adjustment. A roll of adhesive plaster or tape may then be wound on to the roller by first removing for about one inch from one end of the plaster tape the crinoline back usually provided, and then pressing this end of the tape on to the periphery of the roller 16 to adhesively secure thereto. While holding the adhesive roll in the hand, the operator with the other end pulls outwardly on the knob 29 to release the roller 16, and upon release of the roller 16, the same, under action of spring 22 will rotate in a clockwise direction for winding the tape thereonto. It will be found preferable, in actual practice to wind but about half of the package roll of the plaster on to the roll 16 in this manner; and when this has been accomplished, to loosen the screw 16 and remove the end 14 of the shaft 15 from the slots or grooves 13; and with the roller 16 held in the hands of the operator to manually wind the remaining half of the package roll on to the roller 16. When all the tape has been wound on the roll 16 the same is then placed in position on the bracket, that is to say the ends 14 of the shaft 15 are inserted in the slots 13 after which the screws 16 are tightened for securing the ends of the shaft within said slots, and the shaft on the bracket against rotation.

Now with the adhesive thus wound on the roller 16, whenever it is desired to use the adhesive the free end of the same may be held in one hand, and with the other hand the plunger 28 is retracted for releasing the roller 16. With the roller 16 thus released the desired amount of adhesive may be unwound after which the plunger 28 is projected so as to engage in one of the sockets 27 to secure the roller 16 against the tension of the spring 22. With the roller 16 now locked against rotation a hard pull as necessary may be exerted on the tape while peeling the adhesive off of the crinoline or to break off a piece of the adhesive for use. When the desired amount of adhesive has been used, the rerolling of the adhesive may be readily accomplished by releasing the plunger 28 to permit the roller 16 to rotate under action of spring 22.

The advantages of this rack are obvious compared with the old method of handling materials of this nature. Through the medium of such a rack the tape may be handled with facility and in a sanitary manner not liable to become dirty and contaminated.

Having thus described my invention, what I claim as new is:

1. In a bracket of the class described, a base, supporting standards secured to said base, a shaft mounted between said standards and secured against rotation, means on said standards and engageable with the shaft for securing the latter against rotation, a roller mounted on said shaft for rotation relative thereto, spring means arranged within the roller and engaged with the roller and shaft for normally urging the roller to rotate in one direction, and interengaging means on one of said standards and said roller for releasably securing the roller against rotation, said last named means including a circular series of pockets in one end of said roller, and a spring pressed plunger mounted on said one standard and having an end arranged to engage a selected one of the pockets, a knob for said plunger provided with a flange having a notch, and a pin on said one standard engaging in the notch when the plunger is in a projected position, and engageable with the flange when the plunger is in a retracted position for releasably retaining the plunger in the last named position.

2. In a device of the character described, a pair of opposed standards each having a slot in one face thereof, a shaft supported between said standards and having flattened end portions arranged in said slots, screws threadedly engaged with the standards and having ends extending into the slots to engage the flat ends of the shaft for securing the shaft against rotation, and a spring roller mounted on said shaft to rotate relative thereto.

3. In a device of the character described, a pair of opposed standards each having a slot in one face thereof, a shaft supported between said standards and having flattened end portions arranged in said slots, screws threadedly engaged with the standards and having ends extending into the slots to engage the flat ends of the shaft for securing the shaft against rotation, and a spring roller mounted on said shaft to rotate relative thereto, said roller including bearings mounted on the ends thereof and through which the ends of said shaft extend, and a spring mounted within said roller and secured at one end to said shaft, and at a relatively opposite end to one of said bearings for normally urging the roller to rotate in one direction relative to the shaft.

4. In a device of the character described, a pair of standards, a roller supported between said standards, supporting means for said roller including a shaft having its ends supported by said standards and bearings on the roller and in which portions of said shaft adjacent its ends are journalled, one of said bearings being provided on one side thereof with a circular series of recesses, and a spring pressed plunger mounted on one of said standards having an end arranged to engage in the selected one of the recesses for releasably retaining the roller against rotation.

PIRL B. MYERS.